United States Patent [19]

Yagla et al.

[11] Patent Number: 5,106,034
[45] Date of Patent: Apr. 21, 1992

[54] DEVICE AND PROCESS FOR ATTACHMENT OF PARTS TO ROCKET MOTORS

[75] Inventors: Jon J. Yagla, Fredericksburg; Robert W. Lowry; Otho L. Mears, both of King George, all of Va.

[73] Assignee: The United States of America as represented by the Secretary of the Navy, Washington, D.C.

[21] Appl. No.: 664,010

[22] Filed: Feb. 28, 1991

[51] Int. Cl.⁵ .................................... F42B 10/06
[52] U.S. Cl. .................................. 244/3.24; 29/1.2
[58] Field of Search ............... 244/3.24; 29/1.2, 1.21

[56] References Cited

U.S. PATENT DOCUMENTS

| | | | |
|---|---|---|---|
| 2,968,996 | 1/1961 | Strickland et al. | 89/1.7 |
| 3,276,377 | 10/1966 | Bell | 244/3.24 |
| 3,306,205 | 2/1967 | Marcus et al. | 102/379 |
| 3,378,216 | 4/1968 | Oss et al. | 244/3.24 |
| 3,893,366 | 7/1975 | Murray | 89/1.801 |
| 4,536,928 | 8/1985 | Nicklas et al. | 29/1.2 |
| 4,732,086 | 3/1988 | Schiestl et al. | 244/3.24 |
| 4,833,995 | 5/1989 | Gotz et al. | 244/3.24 |
| 4,869,441 | 9/1989 | Steuer | 244/3.28 |

Primary Examiner—Michael J. Carone
Attorney, Agent, or Firm—John D. Lewis; Kenneth E. Walden

[57] ABSTRACT

An attachment platform positioned longitudinally on a rocket motor chamber and secured with laser welding techniques. Each attachment platform is continuously sealed longitudinally to the rocket motor chamber through the application of laser welding and optical seam tracking. Application of laser welding techniques allows for repair and installation of attachment platforms on rocket motors fully loaded with live propellant.

8 Claims, 2 Drawing Sheets

PRIOR ART

DEVICE AND PROCESS FOR ATTACHMENT OF PARTS TO ROCKET MOTORS

ORIGIN OF THE INVENTION

The invention described herein was made in the performance of official duties by employees of the Department of the Navy and may be manufactured, used, licensed by or for the Government for any governmental purpose without payment of any royalties thereon.

FIELD OF THE INVENTION

This invention relates generally to rocket motor assemblies and more particularly to a device and process for attachment of parts to rocket motors.

BACKGROUND OF THE INVENTION

Many missiles employ solid fuel rocket motors for propulsion. In most instances, the rocket motor is also the main airframe of the flight vehicle. Therefore the rocket motor often has several attached parts, e.g., fins, explosives, guidance electronics. In some cases it is necessary to attach parts to the pressure vessel. The current method of attaching parts to rocket motors is through use of a series of clips welded to the rocket motor chamber. Welding is typically accomplished by conventional electric conduction welding or electron beam welding. However, each welding technique is deficient when it comes to attaching parts to rocket motors.

In particular, electron beam welding is sensitive to stray electromagnetic fields. Accordingly, if the rocket motor being welded is not maintained in a vacuum, the electron beam alignment is likely to be affected by these stray magnetic fields. Unfortunately, the size requirements of such a vacuum chamber are not practical in the case of rocket motors due to costs and the time required to evacuate such a chamber.

Furthermore, welding of the conventional clips can only be accomplished in the circumferential direction with respect to the chamber because axial welding weakens the pressure vessel. FIG. 1(a) is a perspective view of a solid fuel rocket motor chamber 10 with a series of conventional clips 11 individually welded along the circumferential interface 13 of each clip 11. FIG. 1(b) depicts a fin 15 attached to the welded clips 11. The welding of clips 11 in the circumferential direction requires extended surfaces at the base of the clip 11 (thereby forming circumferential interface 13) to provide a sufficient weld area for strength. As a result, the weight of the clip is increased accordingly. Additional strength for attachments can be accomplished only through the use of larger clips or closer spacing of smaller clips. However, closer spacing is limited by the necessity to reach the weld area with the welding rod.

The welding of clips on rocket motor chambers using electric conduction welding creates a heat affected zone which necessitates further heat treatment of the assembled unit. The conventional weld, such as a gas tungsten arc weld, penetrates approximately 25-50 percent of the rocket motor chamber's case. This amount of weld penetration causes heat affected zones completely throughout the rocket motor case. The resulting thermal expansion and subsequent contraction can cause permanent distortion of the assembled unit. In addition, these welding methods cannot be applied to rocket motor chambers which are fully loaded with live propellant. The heat generated by the welds could ignite the propellant. For the same reason, repair of damaged parts or clips cannot be effected on fully loaded rocket motors.

Because the clip can only be welded in the circumferential direction, a void is formed along the longitudinal interface 17 of each clip 11. In practice it has not been possible to completely protect this void from corrosion with special coatings, e.g. phosphate, epoxy. Furthermore, when the rocket is in flight, air flow over the rocket motor chamber 10, indicated by the arrows in FIG. 1(b), is interrupted causing a variety of problems. First, air flow interruption occurs along the longitudinal voids formed along each longitudinal interface 17. Secondly, air flow is interrupted by the spaces between adjacent clips 11. Finally, since the air flow will be aerodynamically heated, the interior of fin 15 may need to be thermally protected.

SUMMARY OF THE INVENTION

Accordingly, it is an object of the present invention to provide a device and method of attaching parts to the exterior of a rocket motor that is not susceptible to corrosion.

It is a further object of the present invention to reduce the turbulent air flow around parts affixed to the rocket motor.

Still another object of the present invention is to provide a safe method of attaching parts to a fully loaded rocket motor.

Other objects and advantages of the present invention will become more obvious hereinafter in the specification and drawings.

In accordance with the invention, an attachment platform and method for affixing same to a fully loaded rocket motor is provided. The attached platform is secured to the exterior of the rocket motor in a longitudinal direction using a series of laser tack welds. The attachment platform is then sealed longitudinally to the rocket motor with a continuous laser weld using optical seam tracking. The resulting longitudinal seal is free of corrosion areas and provides an aerodynamic surface. The application of laser welding techniques minimizes the production of heat, thereby making it possible to install the attachment platform and/or repair damaged parts on fully loaded rocket motors.

DETAILED DESCRIPTION OF THE INVENTION

Figure 1A:
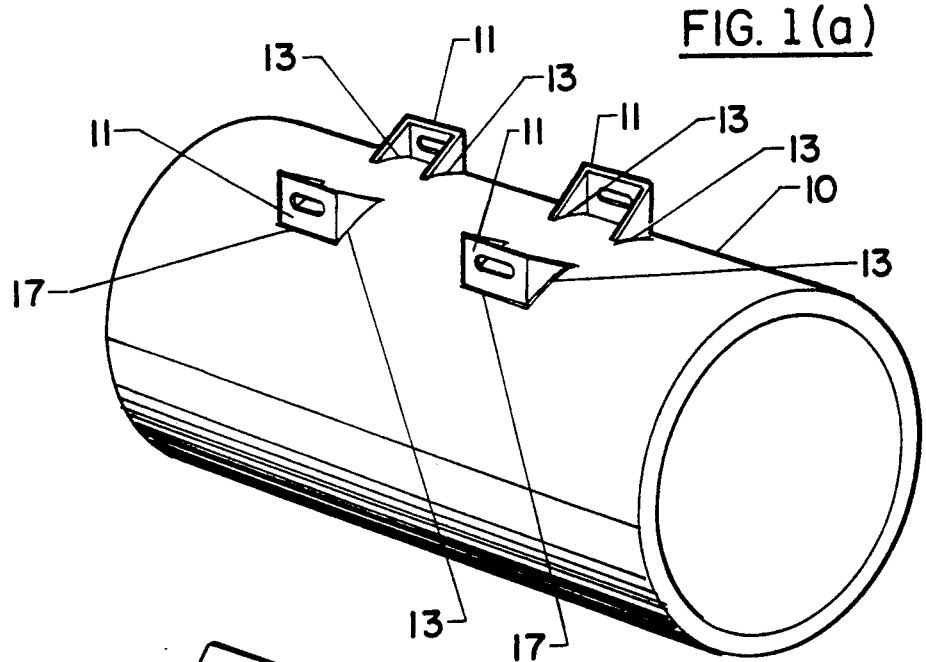
FIG. 1(a) is a perspective view of a solid fuel rocket motor with a series of conventional clips individually and circumferentially welded to the rocket motor.
Figure 1B:
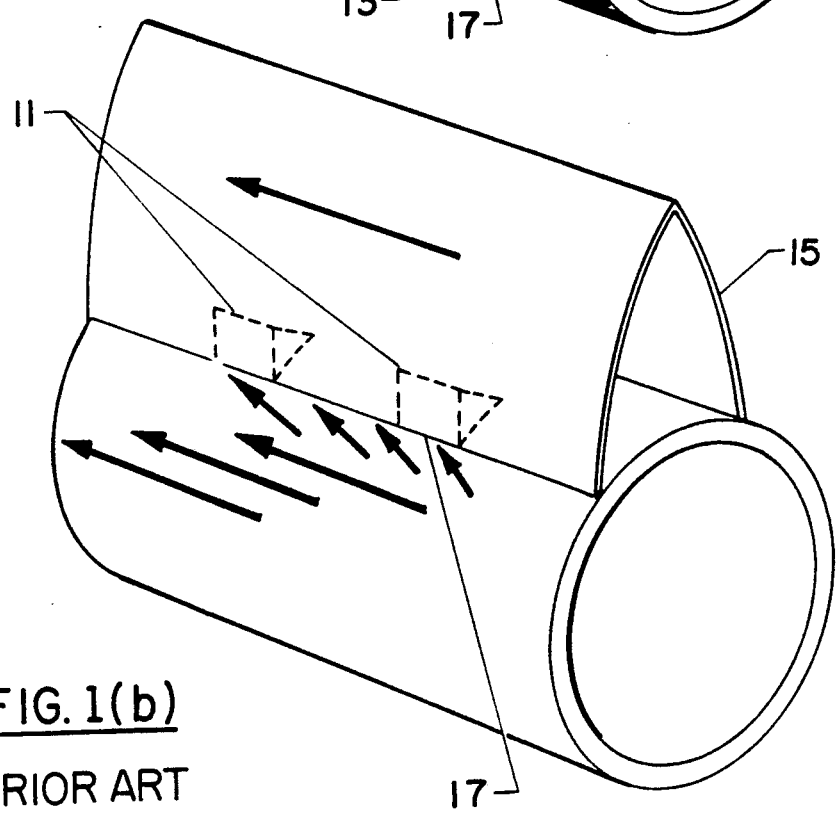
FIG. 1(b) depicts a fin attached to the welded clips mounted on the rocket motor.
Figure 2A:
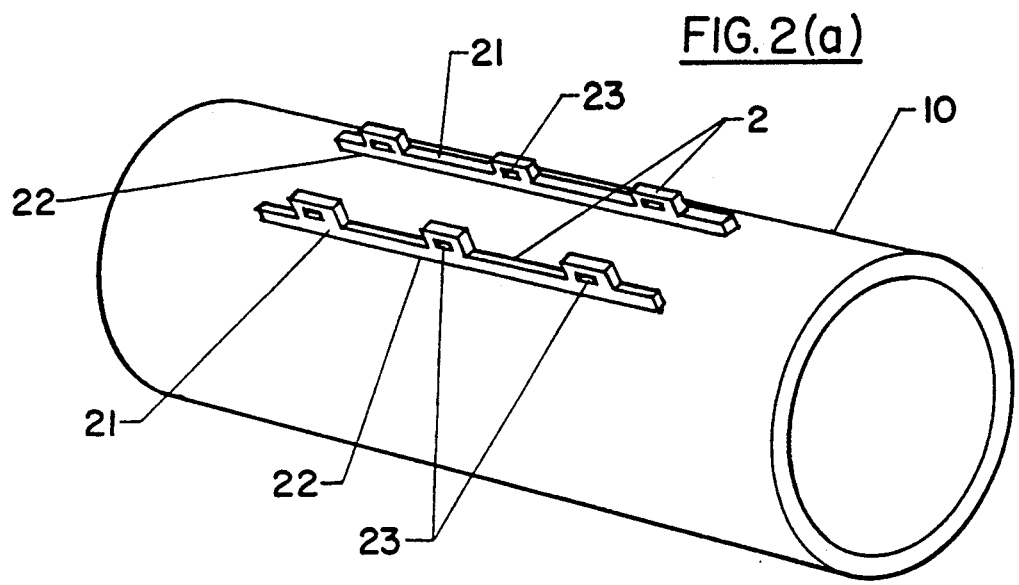
FIG. 2(a) is a perspective view of a rocket motor with two attachment platforms continuously and longitudinally welded along its exterior according to the device and method of the present invention.

Referring now to the drawings, and in particular to FIG. 2(a), two attachment platforms 21 are shown longitudinally mounted to a rocket motor chamber 10. Two attachment platforms 21 will be described by way of example only. However, the device and method of the present invention may apply to any number of platforms 21. Each attachment platform 21 is secured by laser tack welds 2 at each end. The placement of the laser welds is typically governed by numeric control for precision. Typically, the laser is a continuous wave CO2 laser having an annular beam. The laser weld is then used to longitudinally and continuously weld each attachment platform 21 to rocket motor chamber 10 along the interface 22. Optical seam tracking may be used to ensure a precise continuous minimum width seal along the interface 22 between the attachment platform 21 and the rocket motor chamber 10. Since an interface 22 exists on each side of attachment platform 21, the laser weld may be applied to each side. The result is an aerodynamically smooth and corrosion free zone along each interface 22 requiring no special coatings or seals. In addition, a laser cutting technique may then be used to trim excess material and to cut holes 23 of the correct shape and location in each attachment platform 21.

Figure 2B:
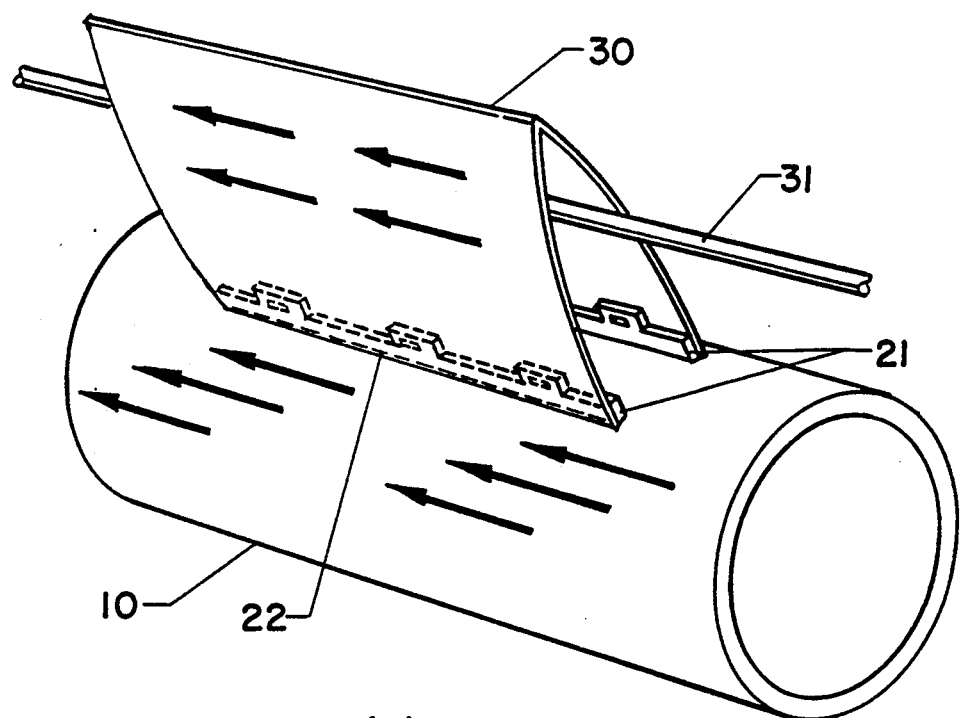
FIG. 2(b) is a perspective view of the rocket motor with a fin affixed to the attachment platforms.

A perspective view of the attachment platform 21 with a fin 30 attached thereto is depicted in FIG. 2(b). For purposes of illustration, an electronic cable 31 is shown passing through the fin 30 to indicate a common usage for this type of attachment part. By continuously and longitudinally sealing attachment platform 21 to rocket motor chamber 10, the in-flight air flow (represented by the arrows) is uninterrupted along the interface 22. The continuous seal formed by the laser welds along interface 22 prevents the aerodynamically heated air flow from entering the passage occupied by electronic cable 31. Thus, no heat protective insulation is required within fin 30.

The advantages of the present invention are numerous. The use of laser welds does not degrade the strength of the rocket motor chamber since it does not subject the chamber to the intense heat associated with conventional electric conduction welding. Metallurgical tests have shown that the laser weld only penetrates into approximately 7-10% of the rocket motor chamber case, resulting in a negligible heat affected zone. Since use of laser welding does not develop large heat affected zones, the necessity for heat treating the rocket motor chamber after clip installation is not required, thus reducing the possibility of permanent distortion due to shrinking and swelling. Additionally, laser welds applied with optical seam tracking allows for precise and continuous longitudinal seaming of the attachment platform. The continuous seal prevents the formation of voids at the interface between attachment platform and the rocket motor chamber. The absence of voids precludes the requirement to protect these corrosion areas with special coatings and seals which are often difficult to design. In addition, the continuous seal removes the turbulent airflow developed in flight between the attachment plaform and the rocket motor chamber surface. The continuous seal protects the passage enclosed by an attachment part, such as a fin, from aerodynamically heated air. Finally, the absence of heat associated with laser welding allows for the safe repair and attachment of parts to a fully loaded rocket motor chamber, thereby reducing condemnation rates and improving repair capabilities.

Although the invention has been described relative to a specific embodiment thereof, there are numerous variations and modifications that will be readily apparent to those skilled in the art in the light of the above teachings. It is therefore to be understood that, within the scope of the appended claims, the invention may be practiced other than as specifically described.

What is claimed is:

1. A rocket motor with parts attachment device, comprising:
   a. a rocket motor;
   b. an attachment platform placed longitudinally along the exterior of the rocket motor;
   c. means for securing said platform to the rocket motor; and
   d. means for continuously and longitudinally sealing said platform directly to the rocket motor pressure vessel whereby an air-tight non-structural longitudinal seal is formed between said platform and the rocket motor.

2. A rocket motor parts attachment device as in claim 1 wherein said securing means are a plurality of tack welds.

3. A rocket motor parts attachment device as in claim 2 wherein said tack welds are laser welds.

4. A rocket motor parts attachment device as in claim 1 wherein said sealing means is a laser weld using optical seam tracking for forming a continuous minimum width weld.

5. A rocket motor with parts attachment device as in claim 1 wherein said attachment platform is a continuous strip bracket extending longitudinally for the length of the rocket motor part to be attached thereon.

6. A method of installing a rocket motor parts attachment device on the exterior of a rocket motor, comprising the steps of:
   a. providing a rocket motor;
   b. placing an attachment platform longitudinally along the exterior of the rocket motor;
   c. securing the platform to the rocket motor; and
   d. continuously and longitudinally sealing the platform to the rocket motor whereby an air-tight nonstructural longitudinal seal is formed between the platform and rocket motor.

7. A method as in claim 6 wherein said step of sealing includes the step of welding the platform to the rocket motor wherein an amount of heat applied during welding is minimized, thereby allowing continuous welding on the pressure vessel while maintaining original pressure vessel strength and heat temper.

8. A method according to claim 7 wherein said step of welding comprises laser welding using optical seam tracking for forming a continuous minimum width weld.

* * * * *